(12) United States Patent  
Paterson

(10) Patent No.: US 12,073,481 B1  
(45) Date of Patent: Aug. 27, 2024

(54) SYSTEMS, DEVICES, AND/OR METHODS FOR MANAGING SERVICES BETWEEN GOVERNMENT AGENCIES AND PARTNERS TO CITIZENS

(71) Applicant: Arielle-Cherie Paterson, Bowie, MD (US)

(72) Inventor: Arielle-Cherie Paterson, Bowie, MD (US)

(*) Notice: Subject to any disclaimer, the term of this patent is extended or adjusted under 35 U.S.C. 154(b) by 0 days.

(21) Appl. No.: 17/526,987

(22) Filed: Nov. 15, 2021

(51) Int. Cl.
| | |
|---|---|
| G06Q 10/10 | (2023.01) |
| G06Q 10/06 | (2023.01) |
| G06Q 10/0631 | (2023.01) |
| G06Q 10/105 | (2023.01) |
| G06Q 30/02 | (2023.01) |
| G06Q 30/06 | (2023.01) |
| G06Q 50/26 | (2012.01) |
| H04L 67/52 | (2022.01) |

(52) U.S. Cl.  
CPC ....... *G06Q 50/26* (2013.01); *G06Q 10/06311* (2013.01); *G06Q 10/105* (2013.01); *H04L 67/52* (2022.05)

(58) Field of Classification Search  
CPC .. G06Q 50/22; G06Q 50/26; G06Q 10/06311; G06Q 10/105; H04L 67/18  
USPC .................................................... 705/1.1–912  
See application file for complete search history.

(56) References Cited

U.S. PATENT DOCUMENTS

| | | | |
|---|---|---|---|
| 11,216,780 B1* | 1/2022 | Matheson | G01C 21/34 |
| 2008/0059268 A1* | 3/2008 | Davantes | G16H 40/20 |
| | | | 705/7.14 |
| 2010/0049485 A1* | 2/2010 | Lee | G06F 30/20 |
| | | | 703/6 |
| 2012/0123789 A1* | 5/2012 | Patel | G16H 40/20 |
| | | | 705/2 |
| 2021/0118026 A1* | 4/2021 | Ingerly | G06Q 30/0607 |

* cited by examiner

*Primary Examiner* — Jonathan P Ouellette

(57) ABSTRACT

Certain exemplary embodiments can provide a method that comprises rendering a first user interface. The first user interface accepts a request from a partner to provide a service to an initiative. Services are provided within a boundary of a governmental entity. The first user interface is structurally changed responsive to information received from a database concerning the service and the initiative.

13 Claims, 3 Drawing Sheets

SYSTEMS, DEVICES, AND/OR METHODS FOR MANAGING SERVICES BETWEEN GOVERNMENT AGENCIES AND PARTNERS TO CITIZENS

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Figure 1:
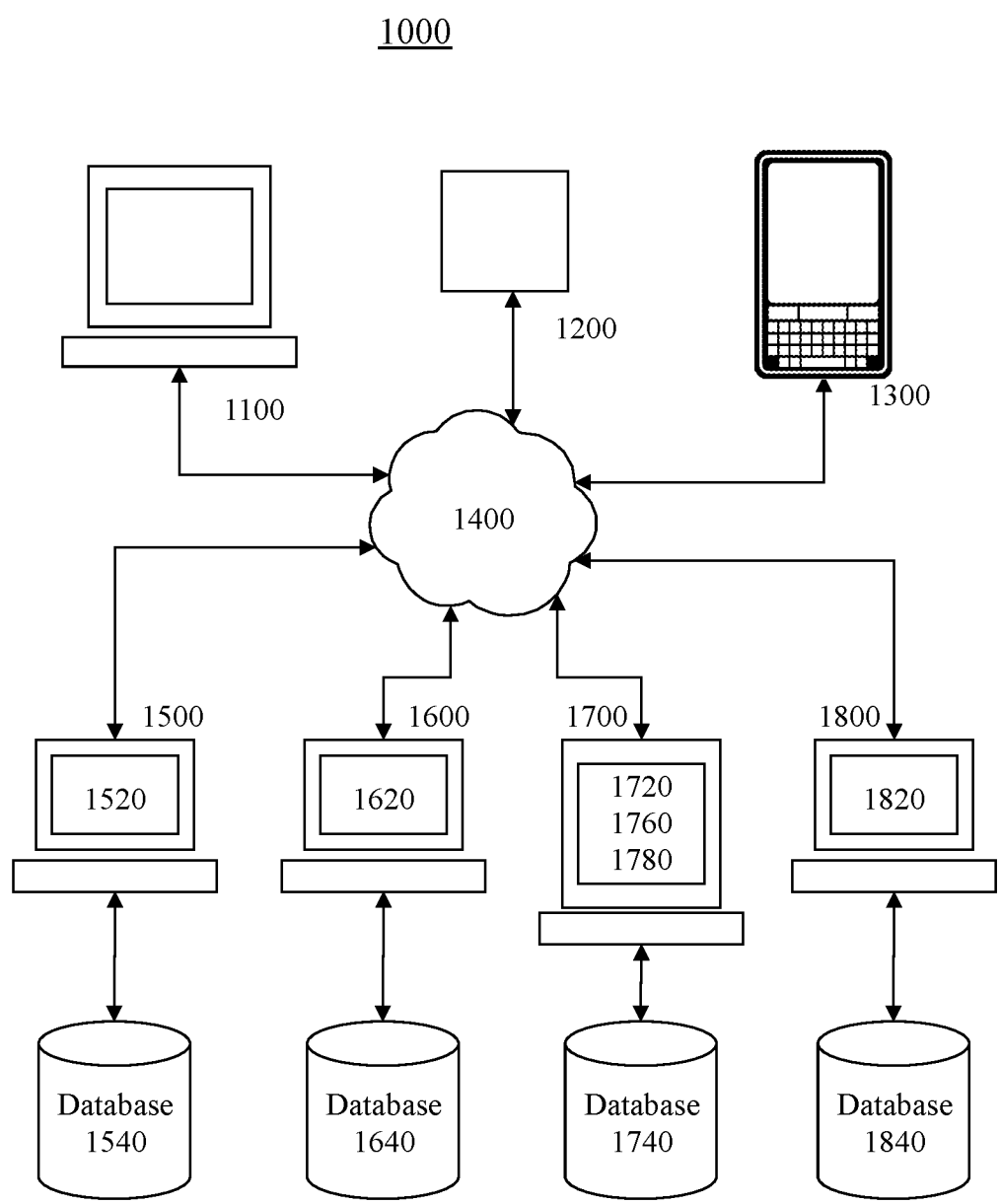
FIG. 1 is a block diagram of an exemplary embodiment of a system 1000.

Certain exemplary embodiments can provide a method comprising rendering a first user interface that accepts a request from a partner of a plurality of partners authorized to provide a service to an initiative created by a governmental entity. The first user interface is structurally changed responsive to information received from a database concerning the service.

Certain exemplary embodiments provide systems and/or methods for the government to quickly organize local facilities as distribution centers to give supplies and services to people in their communities. The two major use cases are for emergency management and public health.

Certain exemplary embodiments utilize profiles stored in one or more databases for citizens (i.e., citizens) government entities and/or partners, etc.

In certain exemplary embodiments, an initiative is set up within a boundary (e.g., a geofence) by a governmental entity. Services are linked to the initiative. Partners are invited to participate in the initiative. Partners that accept the invite select which services they provide.

In certain exemplary embodiments, participating partners configure the services they provide by indicating which of their locations provide the service, during what hours, what inventory is used for the service, the service delivery method a citizen can choose (e.g., home-delivery, onsite location, etc.), as well as pre-service questionnaires and post-service questionnaires.

In certain exemplary embodiments, citizens book services directly.

In certain exemplary embodiments, governmental entities view a data dashboard with real-time numbers about the services completed, upcoming services booked, the popular services in a geographic area, the services each partner has provided, the demographics of those that booked services, and questionnaire answers of those that booked services.

In certain exemplary embodiments, governmental entities benefit via one or more of:
align all departments around clear community initiatives;
identify current needs in each community; and/or
measure each organization's impact, etc.

In certain exemplary embodiments, partners benefit via one or more of:
efficient appointment scheduling;
an ability to display available services to citizens and service benefits; and/or
generate reports on a count of services rendered, etc.

In certain exemplary embodiments, citizens benefit via one or more of:
having a single access-point to get any service of an initiative;
a convenient and confidential system and/or method to sign up for a service of the initiative; and/or
an ability to confidentially review services and organizations.

In certain exemplary embodiments, certain governmental entities oversee initiatives with the goal of distributing supplies and services to people in their communities.

In certain exemplary embodiments, public health departments run community outreach programs. Their goal is to connect people with services that improve their social determinants of health. Certain exemplary embodiments provide public health departments with efficient methods to unite partners together in one place to connect people directly with social care services that improve their social determinants of health.

In certain exemplary embodiments, emergency management departments can deploy supplies and services to help people in communities impacted by natural disasters, pandemics, political unrest, and other crises. Time is important in such situations. Certain exemplary embodiments provide improvements over emergency managers manually calling and/or emailing partners that can act as distribution centers for people to get supplies and services from. Certain exemplary embodiments can improve the time it takes for governments to initiate an emergency response and start recovery. Certain exemplary embodiments can provide quick coordination by emergency managers with partners that can assist in a local, regional, or national emergency response. Emergencies can get worse with delays in finding partners who can support the effort and recovery takes longer leading to lost lives and economic fallouts that are completely preventable. Certain exemplary embodiments can provide an improved process for accessing services and supplies.

Certain exemplary embodiments provide a scalable, high-impact system capable of being leveraged by governments, partners, and citizens. Certain exemplary embodiments provide a stakeholder profile and methods for each stakeholder in the system. Exemplary systems provide a network for coordinating outreach initiatives and works by sending data between accounts. Certain exemplary embodiments solve issues associated with mobilizing local partners in minutes: identifying which partners are available to help, standardizing what supplies and services partners will offer, and giving citizens an easy access point to book all partner services. Certain exemplary embodiments improve the organization and centralization of services. In certain exemplary embodiments, partners seamlessly connect with citizens. In certain exemplary embodiments, reports concerning services are accurate and easy to generate. Certain exemplary embodiments can increase operational efficiencies both for governments and partners. Certain exemplary embodiments establish a feedback loop with citizens for continuous improvement. Certain exemplary embodiments access valuable, real-time reports about the activities of each partner. Certain exemplary embodiments connect citizens directly with the recovery services of each partner via an easy-to-use, multilingual booking system.

Certain exemplary embodiments improve responses to pandemics, emergencies, natural disasters, and/or other crisis events as well as non-crisis outreach initiatives.

The devices, systems, and methods disclosed herein are novel and utilize previously unknown and specialized hardware and/or software. The specialized hardware and/or software change the functionality of existing devices, systems, and/or methods.

FIG. 1 is a block diagram of an exemplary embodiment of a system 1000, which can comprise an information device 1100, tablet 1200, a smartphone 1300, a network 1400, a first server 1500, a second server 1600, a third server 1700, and a fourth server 1800. First server 1500 can comprise a first user interface 1520 and can be coupled to a first database 1540. Second server 1600 can comprise a second user interface 1620 and can be coupled to a second database 1640. Third server 1700 can comprise a third user interface 1720, a processor 1760, machine instructions 1780, and can be coupled to a third database 1740. Fourth server 1800 can comprise a fourth user interface 1820 and can be coupled to a fourth database 1840. Any of the methods and/or steps thereof can be carried out in whole or in part by information device 1100, tablet 1200, smartphone 1300, first server 1500, first database 1540, second server 1600, second database 1640, third server 1700, third database 1740, fourth server 1800, and/or fourth database 1840. Information device 1100, tablet 1200, smartphone 1300, first server 1500, first database 1540, second server 1600, second database 1640, third server 1700, third database 1740, fourth server 1800, and/or fourth database 1840 can each be associated with implementation of a system via which services are offered to citizens and/or citizens utilize services. In certain exemplary embodiments, system 1000 can be used to implement one or more methods disclosed herein.

Figure 2:
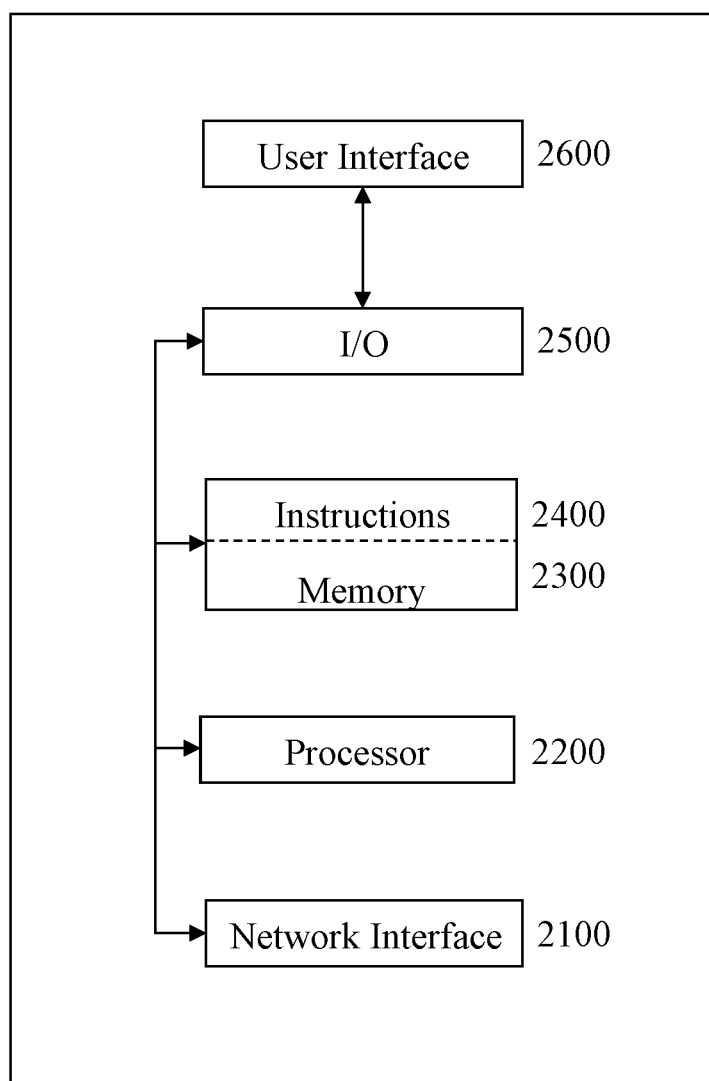
FIG. 2 is a block diagram of an exemplary embodiment of an information device 2000.

FIG. 2 is a block diagram of an exemplary embodiment of an information device 2000, which in certain operative embodiments can comprise, for example, first server 1500 and/or information device 1100 of FIG. 1. Information device 2000 can comprise any of numerous circuits and/or components, such as for example, one or more network interfaces 2100, one or more processors 2200, one or more memories 2300 containing instructions 2400, one or more input/output (I/O) devices 2500, and/or one or more user interfaces 2600 coupled to one or more I/O devices 2500, etc.

In certain exemplary embodiments, via one or more user interfaces 2600, such as a graphical user interface, a citizen can view a rendering of information related to any of the methods described herein.

Figure 3:
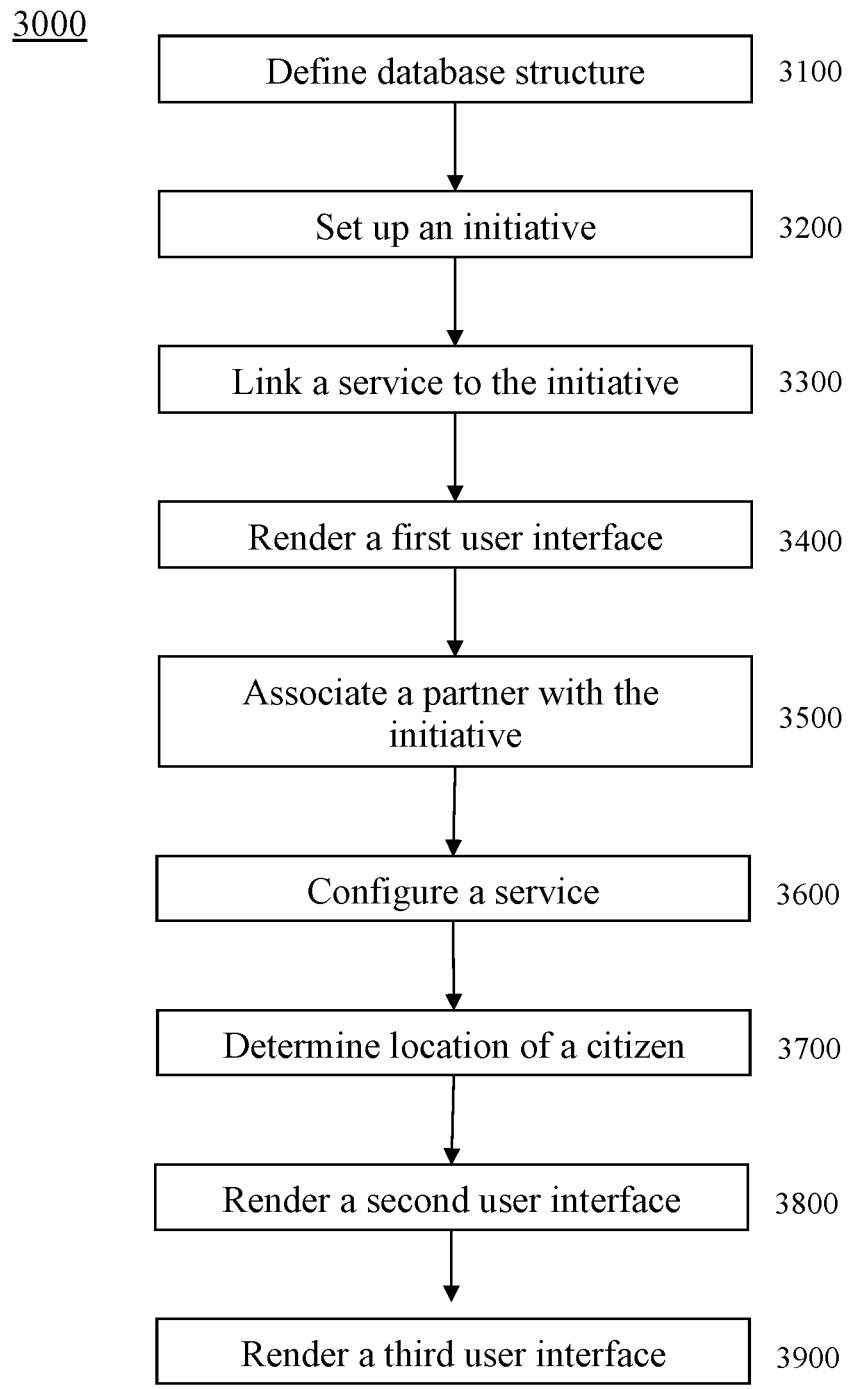
FIG. 3 is a flowchart of an exemplary embodiment of a method 3000.

FIG. 3 is a flowchart of an exemplary embodiment of a method 3000. At activity 3100, a database structure is defined. The database structure comprises a government section, a partner section, and a citizen section. The government section comprises information regarding a plurality of governmental entities. A boundary of each governmental entity of the plurality of governmental entities is defined in the government section of the database structure. In certain exemplary embodiments, the boundary of the governmental entity is a geofence. The partner section comprises information regarding a plurality of partners. Each partner of the plurality of partners offers services within the boundary of the initiative and/or at least one governmental entity of the plurality of governmental entities. The citizen section comprises information regarding a plurality of citizens.

At activity 3200, an initiative is set up in the database. The initiative is created by a governmental entity of the plurality of governmental entities. The initiative is restricted to be within the boundary (e.g., a geofence) of a governmental entity.

At activity 3300, a service is linked to the initiative.

At activity 3400, a first user interface is rendered. The first user interface invites a partner of the plurality of partners authorized to assist the governmental entity to provide the service. The first user interface structurally is changed responsive to information received from the database concerning the initiative. The first user interface requests and causes receipt of information from the partner that causes a registration to provide the service to the initiative. In certain exemplary embodiments, the partner accepts a request to provide the service via the first user interface.

At activity 3500, the partner is associated with the initiative. In certain exemplary embodiments, the partner is automatically associated with the initiative.

At activity 3600, a service is configured. A partner configures the service via a selection of which of their locations provide the service, times at which the service is provided, any items used for the service, the service delivery method, and/or a questionnaire for the service.

At activity 3700, a location of a citizen is determined. In certain exemplary embodiments, an automatic determination is made that the citizen is located within the boundary (e.g. within a geofence).

At activity 3800, a second user interface is rendered. The second user interface accepts a request of a citizen of the plurality of citizens to utilize the service. The second user interface is structurally changed responsive to information received from the database concerning the service. The second user interface accepts information from the citizen to register to receive the service. The second user interface provides a citizen with an option of a delivery method (which delivery method can comprise a location) by which the service will be provided to the citizen. The second user interface provides the citizen with an option of a language selection of the second user interface. A structure of the second user interface is changed responsive to a language selection of the citizen. The second user interface is structurally changed to allow the citizen to select the partner location providing the service, a time for receiving the service, the delivery method to the citizen, and/or answer the questionnaire for the service. In certain exemplary embodiments, the second user interface is structurally changed responsive to the automatic determination that the citizen is located within the boundary.

At activity 3900, a third user interface is rendered. In certain exemplary embodiments, the third user interface is automatically rendered. The third user interface can provide data concerning citizens using services and partners to the governmental entity. In certain exemplary embodiments, the third user interface renders a structure comprising:

a data dashboard with real-time numbers about services completed;
upcoming services that have been scheduled;
services provided in the boundary;
services that each partner has provided;
demographics of the citizen; and/or
questionnaire answers of the citizen.

Definitions

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.

accept—to agree to do something.

activity—an action, act, step, and/or process or portion thereof adapted to—made suitable or fit for a specific use or situation.

and/or—either in conjunction with or in alternative to.

answer—response.

apparatus—an appliance or device for a particular purpose associate—to join, connect together, and/or relate.

automatically—acting or operating in a manner essentially independent of external influence or control. For example, an automatic light switch can turn on upon "seeing" a person in its view, without the person manually operating the light switch.

boundary—something that indicates or fixes a limit or extent.

can—is capable of, in at least some embodiments.

cause—to produce an effect.

change—to make different.

citizen—any person that uses a claimed service; such person does not need to be a legal national or legal resident of a government entity providing a service.

complete—substantially whole or entire.

comprising—including but not limited to.

configure—to make suitable or fit for a specific use or situation.

constructed to—made to and/or designed to.

convert—to transform, adapt, and/or change.

coupling—linking in some fashion.

create—to bring into being.

dashboard—a rendering of various data.

data—distinct pieces of information, usually formatted in a special or predetermined way and/or organized to express concepts.

database—a structured collection of data. A database comprises a group of records, each record containing related data that are stored in pre-defined fields.

data structure—an organization of a collection of data that allows the data to be manipulated effectively and/or a logical relationship among data elements that is designed to support specific data manipulation functions. A data structure can comprise metadata to describe the properties of the data structure. Examples of data structures can include: array, dictionary, graph, hash, heap, linked list, matrix, object, queue, ring, stack, tree, and/or vector.

define—to establish the outline, form, or structure of delivery method—a process via which a service is received by a citizen.

demographic—information associated with a person.

determine—to obtain, calculate, decide, deduce, and/or ascertain.

device—a machine, manufacture, and/or collection thereof.

entity—a distinct and independent person or organization.

estimate—to calculate and/or determine approximately and/or tentatively.

generate—to create, produce, give rise to, and/or bring into existence.

geofence—a virtual geographic boundary, defined by GPS or RFID technology, that enables software to trigger a response when a device is detected in a particular area and/or enters or leaves the particular area.

government—a political entity having authority within a boundary definable by a geofence.

initiative—a program that performs at least one service.

information—data that has been organized to express concepts.

information device—any device capable of processing data and/or information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.

input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which another I/O device can be attached or connected.

location—a place substantially approximating where something physically exists.

language—a system of communication used by a particular country or community.

machine instructions—directions adapted to cause a machine, such as an information device, to perform one or more particular activities, operations, or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software.

machine readable medium—a physical structure from which a machine can obtain data and/or information. Examples include a memory, punch cards, etc.

may—is allowed and/or permitted to, in at least some embodiments.

memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

method—a process, procedure, and/or collection of related activities for accomplishing something; a method can have associated selectable options.

network—a communicatively coupled plurality of nodes. A network can be and/or utilize any of a wide variety of sub-networks, such as a circuit switched, public-switched, packet switched, data, telephone, telecommunications, video distribution, cable, terrestrial, broadcast, satellite, broadband, corporate, global, national, regional, wide area, backbone, packet-switched TCP/IP, Fast Ethernet, Token Ring, public Internet, private, ATM, multi-domain, and/or multi-zone sub-network, one or more Internet service providers, and/or one or more information devices, such as a switch, router, and/or gateway not directly connected to a local area network, etc.

network interface—any device, system, or subsystem capable of coupling an information device to a network. For example, a network interface can be a telephone, cellular phone, cellular modem, telephone data modem, fax modem, wireless transceiver, Ethernet card, cable modem, digital subscriber line interface, bridge, hub, router, or other similar device.

number—a quantitative indicator of a count.

option—a selectable choice.

partner—an entity that provides one or more services to citizens.

plurality—the state of being plural and/or more than one.

predetermined—established in advance.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such as the Core series of microprocessors manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

program—a plan of system under which action may be taken toward a goal.

provide—to furnish, supply, give, and/or make available.

questionnaire—a rendered set of questions that are posed in order to collect information.

real-time—substantially contemporaneous to a current time.

receive—to get as a signal, take, acquire, and/or obtain.

register—to formally request a service.

render—to make perceptible to a human, for example as data, commands, text, graphics, audio, video, animation, and/or hyperlinks, etc., such as via any visual, audio, and/or haptic means, such as via a display, monitor, electric paper, ocular implant, cochlear implant, speaker, etc.

request—to express a desire for and/or ask for.

responsive—reacting to an influence and/or impetus.

schedule—procedural plan that indicates a time when a service will be provided.

section—a distinct part or portion of something.

select—to make a choice or selection from alternatives.

service—an activity provided for the benefit of another.

set—a related plurality.

setting up—configuring for use.

signal—information, such as machine instructions for activities and/or one or more letters, words, characters, symbols, signal flags, visual displays, and/or special sounds, etc. having prearranged meaning, encoded as automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, frequency, phase, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal and/or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, de-multiplexed, decrypted, and/or decoded, etc.

store—to place, hold, and/or retain data, typically in a memory.

structure—something that is created or built.

substantially—by an ample or sufficient amount.

support—to serve as a foundation for something.

system—a regularly interacting or interdependent group of items forming a unified whole.

time—when something occurs.

transmit—to send as a signal, provide, furnish, and/or supply.

upcoming—scheduled to occur in the future.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A user interface can include one or more animation elements such as, for example, elements controlling animation play, pause, fast forward, reverse, zoom-in, zoom-out, rotate, tilt, color, intensity, speed, frequency, appearance, etc.

via—by way of and/or utilizing.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

no characteristic, function, activity, or element is "essential";

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope. No claim of this application is intended to invoke paragraph six of 35 USC 112 unless the precise phrase "means for" is followed by a gerund.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive, and the scope of subject matter protected by any patent that issues based on this application is defined only by the claims of that patent.

What is claimed is:

1. A method comprising:

defining a structure of a database, the structure of the database comprising a government section, a partner section, and a citizen section, wherein:

the government section comprising a plurality of governmental entities, a boundary of each governmental entity of the plurality of governmental entities defined in the government section;

the partner section comprising a plurality of partners, each partner of the plurality of partners offering at least one service within the boundary of at least one governmental entity of the plurality of governmental entities;

the citizen section comprising information concerning a plurality of citizens;

setting up an initiative in the database, the initiative created by at least one governmental entity of the plurality of governmental entities, the initiative restricted to be within the boundary of at least one governmental entity of the plurality of governmental entities;

linking a service to the initiative;

rendering a first user interface that invites a partner of the plurality of partners authorized to assist the governmental entity to provide the service within the boundary of at least one governmental entity of the plurality of governmental entities, the first user interface structurally changed responsive to information received from the database concerning the initiative, wherein the first user interface requests that the partner provide the service to the initiative, the first user interface constructed for the partner to accept an invitation to provide the service to the initiative;

automatically rendering a second user interface, the second user interface constructed to query the partner to configure services that the partner provides, the second user interface comprising at least one menu from which the partner selects at least one location at which the partner will provide the service, during what hours the partner will provide the service, and service delivery methods;

automatically associating the partner with the initiative;

automatically rendering a third user interface that accepts a request of a citizen of the plurality of citizens to utilize the service, the third user interface structurally changed responsive to information received from the database concerning the service, wherein the third user interface accepts information from the citizen to register to receive the service, the third user interface constructed for the citizen to select:

a location at which the citizen will receive the service; and a service delivery method.

2. The method of claim 1, wherein:

a fourth user interface is constructed for the governmental entity to create a questionnaire concerning the service.

3. The method of claim 1, wherein:

the third user interface is constructed for the citizen to select a time for receiving the service.

4. The method of claim 1, wherein:

automatically rendering a fourth user interface that provides data transmitted from the database concerning citizens using services to the partner, the fourth user interface renders a structure comprising:

a data dashboard with real-time numbers about services completed by the partner; and upcoming services that have been scheduled to be provided by the partner.

5. The method of claim 1, wherein:

the third user interface provides the citizen with an option to respond to a questionnaire.

6. The method of claim 1, wherein:

a language of the third user interface is changed responsive to the citizen selecting the language via the third user interface, the language of the third user interface changed responsive to the language selection of the citizen.

7. The method of claim 1, further comprising:

automatically rendering a fourth user interface that provides data transmitted from the database concerning citizens using services to at least one governmental entity or at least one partner, the fourth user interface renders a structure comprising:

a data dashboard with real-time numbers about services completed;

upcoming services that have been scheduled;

services provided in the boundary of the initiative;

services that each partner has provided; and demographics of the citizens.

8. The method of claim 1, further comprising:

determining that the citizen is located within the boundary of at least one initiative, wherein the third user interface is structurally changed responsive to the determination that the citizen is located within the boundary of at least one initiative.

9. The method of claim 1, wherein:

the boundary is a geofence.

10. The method of claim 1, wherein:

the initiative is also offered outside the boundary of any single governmental entity.

11. The method of claim 1, further comprising:

the location at which the citizen will receive the service is a domicile of the citizen.

12. The method of claim 1, further comprising:

the location at which the citizen will receive the service is provided by the citizen.

13. A method comprising:

defining a structure of a database, the structure of the database comprising a government section, a partner section, and a citizen section, wherein:

the government section comprising a plurality of governmental entities, a boundary of each governmental entity of the plurality of governmental entities defined in the government section;

the partner section comprising a plurality of partners, each partner of the plurality of partners offering at least one service within the boundary of at least one governmental entity of the plurality of governmental entities;

the citizen section comprising information concerning a plurality of citizens;

setting up an initiative in the database;

linking a service to the initiative;

rendering a first user interface that invites a partner of the plurality of partners authorized to assist at least one governmental entity to provide the service, the first user interface structurally changed responsive to information received from the database concerning the initiative, wherein the first user interface requests that the partner provide the service to the initiative, wherein the first user interface is constructed to accept a response of the partner to provide the service to the initiative;

automatically rendering a second user interface, the second user interface constructed for the partner to configure services that the partner provides by the partner selecting at least one location at which the partner will provide the service, during what hours the partner will provide the service, and service delivery methods of the service;

automatically associating the partner with the initiative; and automatically rendering a third user interface that accepts a request of a citizen of the plurality of citizens to utilize the service, the third user interface structurally changed responsive to information received from the database concerning the service, wherein the third user interface accepts information from the citizen to register to receive the service.

\* \* \* \* \*